US007645842B2

(12) United States Patent
Acker et al.

(10) Patent No.: US 7,645,842 B2
(45) Date of Patent: Jan. 12, 2010

(54) METHOD FOR FREE-RADICAL POLYMERIZATION OF ETHYLENICALLY UNSATURATED COMPOUNDS

(75) Inventors: Francois Acker, Wissembourg (FR); Markus Scherer, Cologne (DE); Alexander Dardin, Laudenbach (DE); Stephan Massoth, Biblis (DE); Bernd Amrhein, Schaafheim (DE); Detlef Bloos, Eberbach (DE); Valerie Dittgen, Rountzenheim (DE); Alain Roos, Betschdorf (FR); Jean-Marc Beiner, Strasbourg (FR)

(73) Assignee: Rohmax Additives GmbH, Darmstadt (DE)

( * ) Notice: Subject to any disclaimer, the term of this patent is extended or adjusted under 35 U.S.C. 154(b) by 98 days.

(21) Appl. No.: 11/572,330

(22) PCT Filed: Aug. 1, 2005

(86) PCT No.: PCT/EP2005/008296

§ 371 (c)(1),
(2), (4) Date: Jan. 19, 2007

(87) PCT Pub. No.: WO2006/015751

PCT Pub. Date: Feb. 16, 2006

(65) Prior Publication Data

US 2008/0132663 A1  Jun. 5, 2008

(30) Foreign Application Priority Data

Aug. 4, 2004  (DE) ................. 10 2004 037 929

(51) Int. Cl.
*C08F 2/00* (2006.01)
*C08F 2/06* (2006.01)
*C08F 20/10* (2006.01)

(52) U.S. Cl. .................. 526/86; 526/227; 526/321; 526/329.7; 526/919

(58) Field of Classification Search .............. 526/86, 526/919, 227, 321, 329.7
See application file for complete search history.

(56) References Cited

U.S. PATENT DOCUMENTS

| 2,600,451 | A | * | 6/1952 | Van Horne et al. ........ 526/329.5 |
| 4,367,320 | A | * | 1/1983 | Murray ........................ 526/75 |
| 4,956,430 | A | | 9/1990 | Tazi |
| 5,444,141 | A | * | 8/1995 | Guo .......................... 526/347 |
| 6,080,794 | A | | 6/2000 | Auschra et al. |
| 6,409,778 | B1 | | 6/2002 | Auschra et al. |
| 6,458,750 | B1 | | 10/2002 | Dardin et al. |
| 6,639,099 | B1 | | 10/2003 | Knebel et al. |
| 2005/0148749 | A1 | | 7/2005 | Scherer et al. |
| 2005/0239937 | A1 | | 10/2005 | Scherer et al. |
| 2005/0245406 | A1 | | 11/2005 | Scherer et al. |
| 2005/0261143 | A1 | | 11/2005 | Scherer et al. |
| 2005/0267239 | A1 | | 12/2005 | Scherer |
| 2006/0142168 | A1 | | 6/2006 | Kinker et al. |
| 2006/0189490 | A1 | | 8/2006 | Dardin et al. |
| 2006/0240999 | A1 | | 10/2006 | Placek et al. |
| 2008/0194861 | A1 | | 8/2008 | Schmitt et al. |
| 2008/0300373 | A1 | | 12/2008 | Schmitt et al. |

FOREIGN PATENT DOCUMENTS

WO     WO 03/074578     *  9/2003

OTHER PUBLICATIONS

U.S. Appl. No. 10/593,082, filed Sep. 15, 2006, Scherer, et al.
U.S. Appl. No. 10/592,363, filed Sep. 11, 2006, Scherer, et al.
U.S. Appl. No. 11/587,988, filed Oct. 30, 2006, Fischer, et al.
U.S. Appl. No. 11/547,612, filed Oct. 4, 2006, Scherer, et al.
U.S. Appl. No. 11/572,181, filed Jan. 16, 2007, Scherer, et al.
U.S. Appl. No. 12/306,019, filed Dec. 22, 2008, Boehmke, et al.

* cited by examiner

*Primary Examiner*—Fred M Teskin
(74) *Attorney, Agent, or Firm*—Oblon, Spivak, McClelland, Maier & Neustadt, L.L.P.

(57) ABSTRACT

The invention relates to a method for radical polymerization of one or several ethylenically unsaturated compounds, characterized in that it consists in providing at least 80.8 percent by weight ethylenically unsaturated compounds in relation to the total weight of the ethylenically unsaturated compounds, adding at least one polymerization initiator for radical polymerization in at least two steps, wherein more polymerization initiator is added in the second step than in the first.

16 Claims, No Drawings

METHOD FOR FREE-RADICAL POLYMERIZATION OF ETHYLENICALLY UNSATURATED COMPOUNDS

The present invention relates to a process for free-radically polymerizing ethylenically unsaturated compounds and in particular to a process for free-radically polymerizing a monomer composition which comprises at least one alkyl (meth)acrylate.

Processes for free-radically polymerizing alkyl (meth) acrylate-containing monomer mixtures have already been known for some time. For example, the publication EP 0 750 031 A2 discloses processes for free-radically polymerizing a monomer mixture comprising:
(A) about 5% to about 75% by weight of alkyl acrylate ester monomers containing from 1 to 11 carbon atoms in the alkyl group,
(B) about 25% to about 95% by weight of alkyl acrylate ester monomers containing from about 12 to about 24 carbon atoms in the alkyl group; and about 0.1% to about 20% by weight of vinyl-substituted nitrogen heterocyclic monomers, N,N-dialkylaminoalkyl acrylate monomers, N,N-dialkylaminoalkylacrylamide monomers and/or tert-alkylacrylamide, the sum of constituents (A), (B) and (C) adding up to 100% by weight. In a first embodiment of the polymerization process, the monomers to be polymerized and if appropriate a solvent and if appropriate a chain transferer are initially charged in a reactor the polymerization initiator is added and the mixture is heated to the desired reaction temperature for the desired reaction time.

Alternatively, the polymerization is effected by metering in the monomer and the initiator by first preparing a mixture from the monomers and the polymerize ion initiator, initially charging a portion of this mixture, typically from 20 to 40% by weight, in a reactor, healing the reactor to the desired reaction temperature and metering in the rest of the mixture continuously.

Neither variant is entirely satisfactory from a technical point of view. In the first variant, in which the entirety of the monomers is initially charged and the polymerization initiator is then added, owing to the exothermic polymerization reaction, especially in the case of relatively large polymerization batches, it is often possible only with difficulty to keep the polymerization temperature within the desired temperature range and to ensure uniform polymerization. This causes reduced reproducibility of the polymerization process. In the extreme case, there may also be a strongly exothermic profile of the reaction which is no longer controllable (so-called "Trommsdorff effect").

Although the second variant, in which the majority of the monomers is metered in after the reaction has begun, significantly eases the control of the polymerization reaction, especially its temperature, it is comparatively slow and costly.

In view of this prior art, it was therefore an object of the present invention to specify a process for free-radically polymerizing alkyl (meth)acylate-containing monomer compositions with improved space-time yield, which in this way opens up means of increasing capacity in polymerization operations.

The raw materials to be used, such as solvents, chain transferers and initiators, should not differ from types as have been used for previous processes. Equally, a reaction acceleration should be achieved not by processes being established on the basis of controlled free-radical processes described recently in the literature, for example ATRP or RAFT. With regard to molecular weight and molecular weight distribution, the reaction products should not differ significantly from those which have been used in free-radical polymerization processes described to date.

The process to be specified in accordance with the invention should, even in the case of relatively large polymerization batches, enable easy control of the polymerization reaction and especially of the reaction temperature. The risk of occurrence of a polymerization which is no longer controllable ("Trommsdorff effect") should as far as possible be avoided.

The process should be implementable in a simple manner, on the industrial scale and inexpensively. Moreover, it should enable free-radical polymerization with high reproducibility.

This and also further objects which are not stated explicitly but which can be discerned directly from the connections discussed by way of introduction are achieved by a process for free-radically polymerizing ethylenically unsaturated compounds having all features of the present claim 1. Appropriate modifications of the process according to the invention are described in subclaims which refer back to claim 1.

By virtue of, in a process for free-radically polymerizing one or more ethylenically unsaturated compounds, based on the total weight of the ethylenically unsaturated compounds, at least 80.0% by weight of the ethylenically unsaturated compounds being initially charged and at least one polymerization initiator for the free-radical polymerization being added in at least two steps, more initiator being added in the second step than in the first step, it is possible in an unforeseeable manner to free-radically polymerize ethylenically unsaturated compounds with significantly improved space-time yield, which in turn enables a distinct increase in capacity in polymerization operations.

The inventive procedure gives rise in particular to the following advantages:

The process according to the invention enables significantly shorter polymerization times. In comparison with conventional processes, the polymerization times can usually be reduced by at least 30-50%.

A particular characteristic feature of the process according to the invention is that, specifically at the start of reaction, rapid conversions are achieved. Thus, generally as early as after 45 minutes of reaction time, a total of 75% of the amount of monomer used has been converted. The heat of reaction resulting therefrom can be utilized to maintain the heat of reaction needed, or can be removed conveniently if required.

The process according to the invention is not restricted to the use of specific raw materials, for example certain solvents, chain transferers and/or polymerization initiators, and/or to specific polymerization processes, for example ATRP or RAFT. On the contrary, in the present process, the conventional compounds can be used in connection with the free-radical polymerization.

The property profile of the polymers obtainable by the process according to the invention, especially their molecular weight and their molecular weight distribution, does not differ significantly from the polymers prepared conventionally.

The process according to the invention allows the free-radical polymerization of ethylenically unsaturated compounds with high reproducibility.

Even in the case of relatively large polymerization batches, the process according to the invention enables relatively easy control of the polymerization reaction and especially of the reaction temperature. The risk of occurrence of a polymerization which is no anger controllable ("Trommsdorff effect") is ruled out virtually completely.

The process according to the invention is suitable in particular for the free-radical polymerization of monomer or positions which comprise at least one (meth)acrylate, maleate and/or fumarate.

The process according to the invention is implementable in a simple manner, on the industrial scale and inexpensively.

A further advantage of the process according to the invention is that the amount of the polymerization initiator required can be reduced in comparison to conventional processes. In the process according to the invention, initiator savings of approx. 20-40% are realizable.

According to the invention, ethylenically unsaturated compounds are polymerized free-radically. They can be used individually or in a mixture.

Ethylenically unsaturated compounds particularly suitable for the purposes of the present invention include monomer compositions which comprise at least one (meth)acrylate, maleate and/or fumarate. The alcohol radicals may differ. The content of the at least one (meth)acrylate, maleate and/or fumarate is, based on the total weight of the monomer composition, preferably at least 25.0% by weight, preferentially at least 50.0% by weight, in particular at least 75.0% by weight.

The expression (meth)acrylates encompasses methacrylates and acrylates and mixtures of the two. These monomers are widely known. The alkyl radical may be linear, cyclic or branched.

Monomer mixtures particularly preferred in the context of the present invention contain, based on the total weight of the ethylenically unsaturated compounds, from 0.0 to 40.0% by weight, preferably from 0.1 to 35.0% by weight, in particular from 1.0 to 20.0% by weight, of one or more ethylenically unsaturated ester compounds of the formula (I)

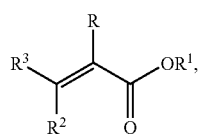

where R is hydrogen or methyl, $R^1$ is a linear or branched alkyl radical having from 1 to 5 carbon atoms, $R^2$ and $R^3$ are each independently hydrogen or a group of the formula —COOR' where R' is hydrogen or an alkyl group having from 1 to 5 carbon atoms.

Examples of compounds of the formula (I) include (meth)acrylates, fumarates and maleates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate;

cycloalkyl (meth)acrylates such as cyclopentyl (meth)acrylate; (meth)acrylates which derive from unsaturated alcohols, such as 2-propynyl (meth)acrylate, allyl (meth)acrylate and vinyl (meth)acrylate.

As a further constituent, the monomer compositions may, based on the total weight of the ethylenically unsaturated compounds, contain from 60.0 to 100.0% by weight, preferably from 65.0 to 99.9% by weight, in particular from 80.0 to 99.9% by weight, of one or more ethylenically unsaturated ester compounds of the formula (II)

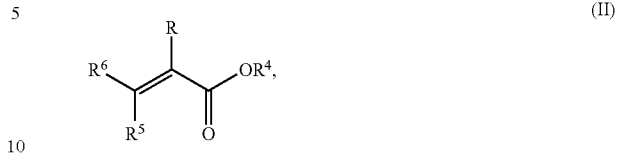

where R is hydrogen or methyl, $R^4$ is a linear or branched alkyl radical having from 6 to 40 carbon atoms, $R^5$ and $R^6$ are each independently hydrogen or a group of the formula —COOR" where R" is hydrogen or an alkyl group having from 6 to 40 carbon atoms.

These include (meth)acrylates, fumarates and maleates which derive from saturated alcohols, such as hexyl (meth)acrylate, 2-ethylhexyl (meth)acrylate, heptyl (meth)acrylate, 2-tert-butylheptyl(meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)-acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth) acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate;

cycloalkyl(meth)acrylates such as 2,4,5-tri-t-butyl-3-vinylcyclohexyl (meth)acrylate, 2,3,4,5-tetra-t-butylcyclohexyl (meth)acrylate;

(meth)acrylates which derive from unsaturated alcohols, for example oleyl (meth)acrylate;

cycloalkyl (meth)acrylates such as 3-vinylcyclohexyl (meth) acrylate, cyclohexyl (meth)acrylate, bornyl (meth)acrylate; and the corresponding fumarates and maleates.

The ester compounds having a long-chain alcohol radical, especially the compounds of the formula (II), can be obtained, for example, by reacting (meth)acrylates, fumarates, maleates and/or the corresponding acids with long-chain fatty alcohols, which generally gives a mixture of esters, for example (meth)acrylates with various long-chain alcohol radicals. These fatty alcohols include Oxo Alcohol® 7911 and Oxo Alcohol® 7900, Oxo Alcohol® 1100, Alfol® 610, Alfol® 810, Lial® 125 and Nafol® types (Sasol Olefins & Surfactant GmbH); Alphanol® 79 (ICI); Epal® 610 and Epal® 810 (Ethyl Corporation); Linevol® 79, Linevol® 911 and Neodol® 25E (Shell AG); Dehydad®, Hydrenol®- and Lorol® types (Cognis); Acropol® and Exxal® 10 (Exxon Chemicals GmbH); Kalcol 2465 (Kao Chemicals).

Among the ethylenically unsaturated ester compounds, particular preference is given to the (meth)acrylates over the maleates and fumarates, i.e. $R^2$, $R^3$, $R^5$ and $R^6$ of the formulae (I) and (II) are each hydrogen in particularly preferred embodiments. Moreover, preference is given to the methacrylates over the acrylates.

According to the invention, preference is given to using monomer compositions of long-chain alkyl (meth)acrylates of the formula (II), the monomer compositions comprising at least one (meth)acrylate having from 6 to 15 carbon atoms in the alcohol radical and at least one (meth)acrylate having from 16 to 40 carbon atoms in the alcohol radical. The content of the (meth)acrylates having from 6 to 15 carbon atoms in the alcohol radical is preferably in the range from 20.0 to 95.0% by weight, based on the weight of the monomer composition. The content of the (meth)acrylates having from 16 to 40 carbon atoms in the alcohol radical is preferably in the range from 0.5 to 60.0% by weight, based on the weight of the monomer composition.

In a further aspect of the present invention, the content of olefinically unsaturated esters having from 8 to 14 carbon atoms is preferably greater than or equal to the content of olefinically unsaturated esters having from 16 to 18 carbon atoms.

The monomer composition favorably further comprises one or more ethylenically unsaturated comonomers which can be copolymerized with the ethylenically unsaturated ester compounds of the formulae (I) and/or (II), but are different therefrom. The content of the comonomers is preferably in the range from 0.0 to 40.0% by weight, in particular from 2.0 to 35.0% by weight and more preferably from 5.0 to 30.0% by weight, based on the weight of the monomer composition.

Comonomers which are particularly suitable in this context correspond to the formula (III):

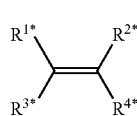

(III)

in which $R^{1*}$ and $R^{2*}$ are each independently selected from the group consisting of hydrogen, halogens, CN, linear or branched alkyl groups having from 1 to 20, preferably from 1 to 6 and more preferably from 1 to 4, carbon atoms which may be substituted by from 1 to (2n+1) halogen atoms, where n is the number of carbon atoms of the alkyl group (for example $CF_3$), $\alpha,\beta$-unsaturated linear or branched alkenyl or alkynyl groups having from 2 to 10, preferably from 2 to 6 and more preferably from 2 to 4, carbon atoms which may be substituted by from 1 to (2n−1) halogen atoms, preferably chlorine, where n is the number of carbon atoms of the alkyl group, for example $CH_2=CCl-$, cycloalkyl groups having from 3 to 8 carbon atoms which may be substituted by from 1 to (2n−1) halogen atoms, preferably chlorine, where n is the number of carbon atoms of the cycloalkyl group; aryl groups having from 6 to 24 carbon atoms which may be substituted by from 1 to (2n−1) halogen atoms, preferably chlorine, and/or alkyl groups having from 1 to 6 carbon atoms, where n is the number of carbon atoms of the aryl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $SO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$ which may be quaternized with an additional $R^{8*}$, aryl or heterocyclyl group, where $Y^*$ may be $NR^{8*}$, S or O, preferably O; $R^{5*}$ is an alkyl group having from 1 to 20 carbon atoms, an alkylthio having from 1 to 20 carbon atoms, $OR^{15}$ ($R^{15}$ is hydrogen or an alkali metal), alkoxy of from 1 to 20 carbon atoms, aryloxy or hetero-cyclyloxy; $R^{6*}$ and $R^{7*}$ are each independently hydrogen or an alkyl group having from 1 to 20 carbon atoms, or $R^{6*}$ and $R^{7*}$ together may form an alkylene group having from 2 to 7, preferably from 2 to 5 carbon atoms, in which case they form a 3- to 8-membered, preferably 3- to 6-membered, ring, and $R^{8*}$ is hydrogen, linear or branched alkyl or aryl groups having from 1 to 20 carbon atoms;

$R^{3*}$ and $R^{4*}$ are independently selected from the group consisting of hydrogen, halogen (preferably fluorine or chlorine), alkyl groups having from 1 to 6 carbon atoms and $COOR^{9*}$ in which $R^{9*}$ is hydrogen, an alkali metal or an alkyl group having from 1 to 40 carbon atoms, or $R^{3*}$ and $R^{4*}$ together may form a group of the formula $(CH_2)_{n'}$ which may be substituted by from 1 to 2n' halogen atoms or $C_1$ to $C_4$ alkyl groups, or form the formula $C(=O)-Y^*-C(=O)$ where n' is from 2 to 6, preferably 3 or 4, and $Y^*$ is as defined above, and where at least 2 of the $R^{1*}$, $R^{2*}$, $R^{3*}$ and $R^{4*}$ radicals are hydrogen or halogen.

These include:

aryl (meth)acrylates such as benzyl methacrylate or phenyl methacrylate in which the aryl radicals may each be unsubstituted or up to tetrasubstituted;

methacrylates of halogenated alcohols, such as
2,3-dibromopropyl methacrylate,
4-bromophenyl methacrylate,
1,3-dichloro-2-propyl methacrylate
2-bromoethyl methacrylate,
2-iodoethyl methacrylate,
chloromethyl methacrylate;

vinyl halides, for example vinyl chloride, vinyl fluoride, vinylidene chloride and vinylidene fluoride;

vinyl esters such as vinyl acetate;

styrene, substituted styrenes having an alkyl substituent in the side chain for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;

heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles;

vinyl and isoprenyl ethers;

maleic acid and maleic acid derivatives, for example maleic anhydride, methylmaleic anhydride, maleimide, methylmaleimide;

fumaric acid and fumaric acid derivatives;

acrylic acid and (meth)acrylic acid;

dienes, for example divinylbenzene;

hydroxyalkyl (meth)acrylates such as
3-hydroxypropyl methacrylate,
3,4-dihydroxybutyl methacrylate,
2-hydroxyethyl methacrylate,
2-hydroxypropyl methacrylate,
2,5-dimethyl-1,6-hexanediol (meth)acrylate,
1,10-decanediol (meth)acrylate, carbonyl-containing methacrylates such as
2-carboxyethyl methacrylate,
carboxymethyl methacrylate, oxazolidinylethyl methacrylate,
N-(methacryloyloxy)formamide,
acetonyl methacrylate,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone,
N-(2-methacryloyloxypentadecyl)-2-pyrrolidinone,
N-(3-methacryloyloxyheptadecyl)-2-pyrrolidinone;

glycol dimethacrylates such as
1,4-butanediol methacrylate,
2-butoxyethyl methacrylate,
2-ethoxyethoxymethyl methacrylate,
2-ethoxyethyl methacrylate;

methacrylates of ether alcohols, such as
tetrahydrofurfuryl methacrylate,
vinyloxyethoxyethyl methacrylate,
methoxyethoxyethyl methacrylate,
1-butoxypropyl methacrylate,
1-methyl-(2-vinyloxy)ethyl methacrylate,
cyclohexyloxymethyl methacrylate,
methoxymethoxyethyl methacrylate,
benzyloxymethyl methacrylate,
furfuryl methacrylate,
2-butoxyethyl methacrylate,
2-ethoxyethoxymethyl methacrylate,
2-ethoxyethyl methacrylate,
allyloxymethyl methacrylate,
1-ethoxybutyl methacrylate,
methoxymethyl methacrylate,
1-ethoxyethyl methacrylate,
ethoxymethyl methacrylate and ethoxylated (meth)acrylates
  which have preferably from 1 to 20, in particular from 2 to
  8, ethoxy groups;

aminoalkyl (meth)acrylates and aminoalkyl (meth)acrylatamides, such as
N-(3-dimethylaminopropyl)methacrylamide,
dimethylaminopropyl methacrylate,
3-diethylaminopentyl methacrylate,
3-dibutylaminohexadecyl (meth)acrylate;

nitriles of (meth)acrylic acid and other nitrogen-containing methacrylates, such as
N-(methacryloyloxyethyl)diisobutyl ketimine,
N-(methacroyloxyethyl)dihexadecyl ketimine,
methacryloylamidoacetonitrile,
2-methacryloyloxyethylmethylcyanamide,
cyanomethyl methacrylate;

heterocyclic (meth)acrylates such as
2-(1-imidazolyl)ethyl (meth)acrylate,
2-(4-morpholinyl)ethyl (meth)acrylate and
1-(2-methacryloyloxyethyl)-2-pyrrolidone;

oxiranyl methacrylates such as
2,3-epoxybutyl methacrylate,
3,4-epoxybutyl methacrylate,
10,11-epoxyundecyl methacrylate,
2,3-epoxycyclohexyl methacrylate,
10,11-epoxyhexadecyl methacrylate;
glycidyl methacrylate.

These monomers may be used individual y or as a mixture.
In the process according to the invention based or the total weight of the ethylenically unsaturated compounds, at least 80.0% by weight, preferably at least 85.0% by weight, favorably at least 90.00 by weight, more preferably at least 95.0% by weight, in particular at least 99.0% by weight, of the ethylenically unsaturated compounds is initially charged.

In a particularly preferred embodiment of the present invention not the entirety of the monomers used but only a portion preferably 85.0-99.9% by weight of the total amount of the ethylenically unsaturated monomers, is introduced into the initial charge, and a small portion of the monomers used, preferably 0.1-15.0 by weight, based on the total amount of monomer, is added toward the end of the process.

When mostly or exclusively alkyl methacrylates are used at the start of the reaction, it is advisable to add alkyl acrylates, preferably 2.0-5.0% by weight, based on the total amount of monomer, likewise toward the end of the polymerization, for the reason that low residual monomer contents are obtained.

The free-radical polymerization of the ethylenically unsaturated compounds can be effected in a manner known per se. The customary free-radical polymerization is detailed, inter alia, in Ullmanns's Encyclopedia of Industrial Chemistry, Sixth Edition.

In the context of the present invention, the polymerization is initiated using at least one polymerization initiator for free-radical polymerization. These include the azo initiators widely known in the technical field, such as 2,2'-azobisisobutyronitrile, 2,2'-azobis-(2,4-dimethylvaleronitrile) and 1,1-azobiscyclohexanecarbonitrile, organic peroxides such as dicumyl peroxide, diacyl peroxides such as dilauroyl peroxide, peroxydicarbonates such as diisopropyl peroxydicarbonate, peresters such as tert-butyl peroxy-2-ethylhexanoate, and the like.

Polymerization initiators very particularly suitable for the purposes of the present invention include in particular the following compounds:
methyl ethyl ketone peroxide,
acetylacetone peroxide,
dilauroyl peroxide,
tert-butyl per-2-ethylhexanoate,
ketone peroxide,
tert-butyl peroctoate,
methylisobutyl ketone peroxide,
cyclohexanone peroxide,
dibenzoyl peroxide,
tert-butyl peroxybenzoate,
tert-butyl peroxyisopropylcarbonate,
2,5-bis(2-ethylhexanoylperoxy)-2,5-dimethylhexane,
tert-butylperoxy-2-ethylhexanoate,
tert-butylperoxy-3,5,5-trimethylhexanoate,
dicumyl peroxide,
1,1-bis-(tert-butylperoxy)cyclohexane,
1,1-bis(tert-butylperoxy)-3,3,5-trimethylcyclohexane,
cumyl hydroperoxide,
tert-butyl hydroperoxide,
bis(4-tert-butylcyclohexyl)peroxydicarbonate,
2,2'-azobisisobutyronitrile,
2,2'-azobis(2,4-dimethylvaleronitrile),
1,1-azobiscyclohexanecarbonitrile,
diisopropyl peroxydicarbonate,
tert-amyl peroxypivalate,
di(2,4-dichlorobenzoyl) peroxide,
tert-butyl peroxypivalate,
2,2'-azobis(2-amidinopropane) dihydrochloride,
di(3,5,5-trimethylhexanoyl) peroxide,
dioctanoyl peroxide,
didecanoyl peroxide,
2,2'-azobis(N,N'-dimethyleneisobutyramidine)
di(2-methylbenzoyl)peroxide,
dimethyl-2,2'-azobisisobutyrate,
2,2'azobis(2-methylbutyronitrile), 2,5-dimethyl-2,5-di(2-ethylhexanoylperoxy)hexane,
4,4'-azobis(cyanopentanoic acid)
di(4-methylbenzoyl)peroxide,
dibenzoyl peroxide,
tert-amyl peroxy-2-ethylhexanoate,
tert-butyl peroxy-2-ethylhexanoate,
tert-butyl peroxyisobutyrate and also mixtures of the aforementioned polymerization initiators.

According to the invention, very particular preference is given to polymerization initiators having a half-life of 1 hour at a temperature in the range from 25° C. to 200° C., preferably in the range from 50° C. to 150° C., in particular in the range from 50° C. to 100° C. Also very particularly suitable for the present purposes are peroxide polymerization initiators, especially tert-butyl peroctoate.

Depending on the embodiment, it is also possible to use different polymerization initiators. When different initiator species are used, they are preferably added separately in successive steps, in which case the polymerization initiator added later should appropriately have a higher half-life compared to the polymerization initiator added beforehand.

In the process according to the invention, the at least one polymerization initiator for the free-radical polymerization is added in at least two steps. In this case, the addition of the polymerization initiator in each step can be effected in undiluted form or in diluted form, preferably dissolved in a solvent, in particular in the form of a from 3 to 25% by weight solution in at least one mineral oil.

In a first, particularly preferred embodiment of the present invention, the polymerization initiator is added in the first step preferably all at once. However, it has also been found to be very particularly appropriate to meter in the polymerization initiator in the first step, preferably continuously, especially with a constant metering rate.

In the second step, the polymerization initiator, in a first particularly preferred embodiment of the present invention is preferably added all at once. Alternatively, however it is also preferred to meter in the polymerization initiator in the second step, preferably continuously, especially with a constant metering rate. In a very particularly preferred embodiment of the present invention, the polymerization initiator is metered in the first and in the second step continuously, favorably with a constant metering rate in each case, in which case the mean metering rate of the second step is preferably greater than the mean metering rate of the first step. The ratio of the mean metering rate of the second step to the mean metering rate of the first step is preferably greater than 1.2:1, preferably in the range from 1.2:1 to 10:1, more preferably greater than 1.5:1 even more preferably greater than 2:1, in particular greater than 3:1.

According to the invention, the amount of polymerization initiator added in the second step is greater than the amount added in the first step, in which case, based on the total weight of the polymerization initiator added in the first step, preferably at least 120%, appropriately from 120% to 1000%, more preferably at least 150%, in particular from 150% to 500, of the amount of polymerization initiator added in the first step is added in the second step.

The second step is preferably begun at a time at which from 0.01 to 50.0%, appropriately from 10.0 to 40.0%, in particular from 15.0 to 35.0% by weight, of the total amount of the polymerization initiator added during the first step is as yet unconsumed.

The proportion of as yet unconsumed polymerization initiator can be determined in a manner known per se or can be calculated on the basis of the parameters known per se, for example the decomposition constant of the polymerization initiator, the temperature profile during the polymerization and the addition profile. For metered addition at constant rate at a constant temperature, an example of an approximation which applies is:

$$I_{ss}/I_{\Sigma}=1/(k_d t_{\Sigma})$$

where the quotient $I_{ss}/I_{\Sigma}$ denotes the proportion of as yet unconsumed polymerization initiator based on the total amount of the polymerization initiator added during the first step, where $k_d$ is the decomposition constant of the polymerization initiator and where $t_{\Sigma}$ is the duration of metered addition.

For the purposes of the present invention, it has been found to be very particularly favorable to add the polymerization initiator in at least three steps, more initiator being added in the third step than in the first step and than in the second step. In the third step, the polymerization initiator is appropriately added all at once. Alternatively, it is also preferred to meter in the polymerization initiator in the third step, preferably continuously, especially with a constant metering rate. In a very particularly preferred embodiment of the present invention, the polymerization initiator is metered in the first, in the second and in the third step continuously, appropriately with a constant metering rate in each case, the mean metering rate of the third step preferably being greater than the mean metering rate of the second step, and the mean metering rate of the second step preferably being greater than the mean metering rate of the first step. The ratio of the mean metering rate of the third step to the mean metering rate of the second step is preferably greater than 1.2:1, preferentially in the range from 1.2:1 to 10:1, more preferably greater than 1.5:1, even more preferably greater than 2:1, especially greater than 3:1.

According to the invention, the amount of polymerization initiator added in the third step is preferably greater than the amount added in the second step, in which case, based on the total weight of the polymerization initiator added in the second step, preferably at least 120%, appropriately from 120% to 1000%, more preferably at least 150%, in particular from 150% to 500%, of the amount of polymerization initiator added in the second step is added in the third step.

The third step is preferably begun at a time at which from 0.01 to 50.0%, appropriately from 10.0 to 40.0%, in particular from 15.0 to 35.0% by weight, of the total amount of the polymerization initiator added during the second step is as yet unconsumed.

The proportion of as yet unconsumed polymerization initiator can be determined in a manner known per se or can be calculated on the basis of the parameters known per se, for example the decomposition constant of the polymerization initiator, the temperature profile during the polymerization and the addition profile. For metered addition at constant rate at a constant temperature, an example of an approximation which applies is:

$$I_{ss}/I_{\Sigma}=1/(k_d t_{\Sigma})$$

where the quotient $I_{ss}/I_{\Sigma}$ denotes the proportion of as yet unconsumed polymerization initiator based on the total amount of the polymerization initiator added during the second step, where $k_d$ is the decomposition constant of the polymerization initiator and where $t_{\Sigma}$ is the duration of metered addition.

In a particularly preferred embodiment of the invention, the polymerization initiator is added in more than three steps, more polymerization initiator being added in each subsequent step from the fourth step than in the immediately preceding step, and the polymerization initiator being added all at once or metered in continuously, preferably with constant metering rate.

In the context of the present invention it has been found to be very particularly favorable to meter in the polymerization initiator with continuously rising metering rate. This corresponds to an addition of continuously rising amounts of polymerization initiator in an infinite number of steps.

The process according to the invention allows rapid and exceedingly effective polymerization of ethylenically unsaturated compounds and leads to polymers having comparatively small residual monomer contents. Nevertheless it has occasionally been found to be exceedingly favorable to add further initiator toward the end of the reaction, in order to lower the residual monomer content of the reaction mixture even further. Further initiator is preferably added at a time at which at least 75.0% by weight, appropriately at least 90.0% by weight, especially at least 95.0% by weight, of the total amount of the polymerization initiator added during the last step has been consumed. Preference is given to metering in a further from 0.1% by weight to 100.0% by weight in particular from 5.0% by weight to 50.0% by weight of polymerization initiator based on the total amount of polymerization initiator added beforehand.

The novel process can be performed either in the presence or absence of a chain transferer. The chain transferers used may be typical species described for free-radical polymerizations, as known to those skilled in the art.

In particular, it is advisable to use mercaptans, for example n-butyl mercaptan, n-dodecyl mercaptan, 2-mercapto ethanol 2-ethylhexyl thioglycolate or pentaerythrityl tetrathioglycolate; the chain transferer preferably being used in amounts of from 0.05 to 5.0% by weight, preferably in amounts of from 0.1 to 2.0% by weight and more preferably in amounts of from 0.2 to 1.0% by weight, based in each case on the total mass of the ethylenically unsaturated compounds. In this context, the person skilled in the art can draw from the technical literature, especially the publications H. Rausch-Puntigam, T. Völker "*Acryl-und Methacrylverbindungen*" Springer, Heidelberg, 1967; Houben-Weyl "*Methoden der organischen Chemie*" Vol. XIV/1, p. 66ff., Georg Thieme, Heidelberg, 1961 and Kirk-Othmer "*Encyclopedia of Chemical Technology*" Vol. 1, p. 296ff, J. Wiley, New York, 1978. In the context of the present invention, very particular preference is given to the use of n-dodecyl mercaptan as a chain transferer.

The polymerization can be performed with or without solvent. The term "solvent" is to be understood here in a broad sense.

The polymerization is preferably performed in an organic solvent, especially in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually or else as a mixture. Particularly preferred solvents are mineral oils, natural oils and synthetic oils, and also mixtures thereof. Among these, mineral oils of API groups I, II or III are very particularly preferred.

Mineral oils are known per se and commercially available. They are generally obtained from petroleum or crude oil by distillation and/or refining and optionally further purification and finishing processes, the term mineral oil including in particular the higher-boiling fractions of crude oil or petroleum. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties is attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The fraction of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally $\geq 60\%$ by weight, preferably $\geq 80\%$ by weight, without any intention that this should impose a restriction. A preferred mineral oil contains from 0.5 to 30% by weight of aromatic fractions, from 15 to 40% by weight of naphthenic fractions, from 35 to 80% by weight of paraffin-base fractions, up to 3% by weight of n-alkanes and from 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:
n-alkanes having from approx. 18 to 31 carbon atoms:
0.7-1.0%,
slightly branched alkanes having from 18 to 31 carbon atoms:
1.0-8.0%,
aromatics having from 14 to 32 carbon atoms:
0.4-10.7%,
iso- and cycloalkanes having from 20 to 32 carbon atoms:
60.7-82.4%,
polar compounds:
0.1-0.8%,
loss:
6.9-19.4%.

Valuable information with regard to the analysis of mineral oils and a list of mineral oils which have a different composition can be found, for example, in Ullmann's Encyclopedia of Industrial Chemistry, 5th Edition on CD-ROM, 1997, under "lubricants and related products".

Synthetic oils include organic esters, for example diesters and polyesters, polyalkylene glycols, polyethers, synthetic hydrocarbons, especially polyolefins, among which preference is given to polyalphaolefins (PAO), silicone oils and perfluoroalkyl ethers. They are usually somewhat more expensive than the mineral oils, but have advantages with regard to their performance.

Natural oils are animal or vegetable oils, for example neatsfoot oils or jojoba oils.

These oils may also be used as mixtures and are in many cases commercially available.

In a very particularly preferred embodiment of the present invention, the polymerization is, however, performed without solvent. This process variant is suitable in particular for the preparation of comparatively low molecular weight polymers which preferably have a number-average molecular weight of less than 50 000 g/mol, preferably less than 25 000 g/mol, in particular in the range from 5000 to 20 000 g/mol.

The polymerization can be performed at standard pressure, reduced pressure or elevated pressure. The polymerization temperature too is uncritical. In generals however, it is in the range of −20°-200° C., preferably in the range of 0°-180° C., favorably in the range of 50°-180° C., more preferably in the range of 50°-130° C., and in particular in the range of 60-120° C.

The polymerization is preferably carried out at a constant reaction temperature which, over the course of the entire polymerization reaction, varies from the desired temperature preferably by less than ±20° C., more preferably by less than ±10° C., in particular by less than ±5° C.

For this purpose, the polymerization vessel is preferably surrounded by a medium which can very rapidly and efficiently remove the heat of polymerization which arises. To further reduce temperature variations, it has been found to be exceedingly favorable to control the temperature in the polymerization vessel by means of the addition rate of the polymerization initiator, by briefly increasing the addition rate of the polymerization initiator to increase the temperature and briefly lowering the addition rate of the polymerization initiator to reduce the temperature.

Moreover, the procedure is favorably to initially charge the reaction mixture comprising the ethylenically unsaturated compounds in a reaction vessel, to heat the reaction mixture at the desired polymerization temperature using a suitable heating medium until the reaction mixture has the desired polymerization temperature, to initiate the polymerization by adding or metering in the polymerization initiator and, directly after the addition or directly after the start of metered addition of the polymerization initiator, lowering the temperature of the heating medium compared to the temperature set beforehand, preferably by from 2 to 10° C., in particular by from 5 to 10° C.

In the context of the present invention, the amounts of monomers, polymerization initiator, chain transferer and solvent are preferably selected such that a weight-average molecular weight in the range of 2000 and 5 000 000 g/mol, preferably in the range from 10 000 to 1 000 000 g/mol, appropriately in the range from 15 000 to 500 000 g/mol especially in the range from 20 000 to 300 000 g/mol, is obtained. These values are based on the weight-average molecular weight (Mw).

The polydispersity of the polymers obtainable in accordance with the invention is the quotient of weight-average and number-average molecular weight (Mw/Mn). The molecular weights can be determined by known methods. For example, gel permeation chromatography, also known as size exclusion chromatography (SEC), can be used. It is equally possible to use an osmometric process, for example vapor phase osmometry, to determine the molecular weights. The processes mentioned are described, for example, in: P. J. Flory, "Principles of Polymer Chemistry" Cornell University Press (1953), Chapter VII, 266-316 and "Macromolecules, an Introduction to Polymer Science", F. A. Bovey and F. H. Winslow, Editors, Academic Press (1979), 296-312 and W. W. Yau, J. J. Kirkland and D. D. Bly, "Modern Size Exclusion Liquid Chromatography", John Wiley and Sons, New York, 1979. The molecular weights of the polymers presented herein are preferably determined by using gel permeation chromatography. Measurements should preferably be made against polymethyl acrylate or polyacrylate standards.

The polymers obtainable by the process according to the invention can be isolated further processed and optionally finished by adding suitable additives in a manner known per se. These additives include viscosity index improvers, antioxidants, aging stabilizers wear protectants corrosion inhibitors, detergents, dispersants, EP additives friction modifiers, dyes odorants, metal deactivators and/or demulsifiers.

However, the polymers obtainable in accordance with the invention can also be used directly i.e. without further additions for example as viscosity index improvers.

The invention will be illustrated in detail below by examples and comparative examples without any intention that the concept of the invention be restricted to these particular embodiments. The parameters reported were determined as follows:

The reported molecular weights of the polymers are weight averages (Mw). The polydispersities correspond to the quotient of weight-average and number-average molecular weight (Mw/Mn).

The reported kinematic viscosities relate correspondingly to the polymer solutions and not to the pure isolated polymers. The kinematic viscosities are determined by customary processes, for example in an Ubbelohde viscometer to ASTM D 445 or in automatic test apparatus from Herzog. The kinematic viscosity is always reported in $mm^2/s$.

The viscosity index is determined to ASTM D 2270.

The term "thickening action" relates to the kinematic viscosity of a polymer solution which is measured at a certain temperature by diluting a certain amount of the polymer solution with a further solvent. Typically, 10-15% by weight of the polymer solution prepared in each case are diluted in a 150N oil, and the kinematic viscosities of the resulting solution are determined at 40 and 100° C.

The residual monomer contents (e.g. $C_8$-$C_{18}$-alkyl acrylate, MMA) were determined by customary HPLC analysis methods. They are reported either in ppm or % by weight in relation the total weight of the polymer solutions prepared. It should be mentioned by way of example for acrylates substituted by long-chain alkyl that the residual monomer content reported for $C_8$-$C_{18}$-alkyl acrylate, for example, includes all acrylate monomers used which bear alkyl substituents having 8 and 18 carbon atoms in the ester side chains.

COMPARATIVE EXAMPLE 1

A 10 liter stainless laboratory reactor equipped with a 3-level InterMIG stirrer (operated at 78 revolutions per minute), thermometer and reflux condenser is initially charged with 1932 g of a mineral oil of the Group 3 category (e.g. Nexbase 3020 from Fortum) and 214.7 g of a monomer mixture consisting of $C_{12}$-$C_{18}$-alkyl methacrylates, dimethylaminopropyl-methacrylamide and methyl methacrylate (MMA) in a weight ratio of 86.5:3.5:10.0 together with 0.28 g of dodecyl mercaptan. The temperature is adjusted to 90° C. Thereafter, 5.98 g of tert-butyl peroctoate are added and, at the same time, a feed consisting of 4753.3 g of a mixture of $C_{12}$-$C_{18}$-alkyl methacrylates, dimethylaminopropyl-methacrylamide and methyl methacrylate in a weight ratio of 86.5:3.5:10.0, and also 9.51 g of tert-butyl peroctoate and 6.18 g of dodecyl mercaptan, is started. The feeding time is 3.5 hours and the feed rate is uniform. Two hours after the end of feeding, another 10.2 g of tert-butyl peroctoate are added. For better handling and for stabilization, 2132.7 g of a 100N oil and 18.1 g of 4-methyl-2,6-di-tert-butylphenol are also added. The total reaction time is 8 hours.

Molecular weight: 120 000 g/mol
Polydispersity: 3.05
Kinematic viscosity at 100° C.: 642.8 mm²/s
Thickening action (10% of the above product in a 150N oil):
    at 100° C.: 12.68 mm²/s
    at 40° C.: 66.8 mm²/s
Viscosity index: 193
$C_{12-18}$-alkyl methacrylate residual monomer content: 0.25%
MMA residual monomer content: 640 ppm

EXAMPLE 1

A 10 l stainless steel laboratory reactor equipped with a 3-level InterMIG stirrer (operated at 150 revolutions per minute), thermometer and reflux condenser is initially charged with 1604.1 g of a mineral oil of the Group 3 category (e.g. Nexbase 3020 from Fortum) and 4125.0 g of a monomer mixture consisting of $C_{12}$-$C_{18}$-alkyl methacrylates, dimethy-laminopropyl-methacrylamide and methyl methacrylate (MMA) in a weight ratio of 86:5:3.5:10.1 together with 5.6 g of dodecyl mercaptan. The temperature is adjusted to 110° C. Thereafter, 10.3 g of tert-butyl peroctoate are metered in within 2 hours. 22% of the amount specified being added within the first hour and 78% within the second hour. 30 minutes thereafter, another 4.1 g of tert-butyl peroctoate are added. For better handing and for stabilization, 1770.9 g of a 100N oil and 15.0 g of 4-methyl-2,6-di-tert butylphenol are also added. The total reaction time is 4 hours.

Molecular weight: 138 000 g/mol
Polydispersity: 3.10
Kinematic viscosity a 100° C.: 624.7 mm²/s
Thickening action 10% of the above product in a 150N oil):
    at 100° C.: 12.94 mm²/s
    at 40° C.: 67.3 mm²/s
Viscosity index: 197
$C_{12-18}$-alkyl methacrylate residual monomer content: 0.88%
MMA residual monomer content: 1950 ppm

COMPARATIVE EXAMPLE 2

A 24 m³ polymerization reactor equipped with an MIG stirrer (operated at 25 revolutions per minute) and a process control system for controlling the process parameters is initially charged with 6672.7 kg of a 100N oil and 745.6 kg of a monomer mixture consisting of $C_{12}$-$C_{18}$-alkyl methacrylates and methyl methacrylate (MMA) in a weight ratio of 87.0:13.0 together with 0.9 kg of dodecyl mercaptan. The temperature is adjusted to 100° C. Thereafter, 2.2 kg of tert-butyl peroctoate and, at the same time, a feed consisting of 10594.8 kg of a mixture of $C_{12}$-$C_{18}$-alkyl methacrylates and methyl methacrylate in a weight ratio of 87.0:13.0, and also 17.0 kg of ter-butyl peroctoate and 12.7 kg of dodecyl mercaptan, is started. The feeding time is 5 hours and the feed rate is uniform. Two hours after the end of feeding, another 22.7 kg of tert-butyl peroctoate are added. The total reaction time is 12 hours.

Molecular weight: 161 000 g/mol
Polydispersity: 2.30
Kinematic viscosity at 100° C.: 1496 mm²/s
Thickening action (10% of the above product in a 150N oil):
    at 100° C.: 13.87 mm²/s
    at 40° C.: 74.56 mm²/s
Viscosity index: 193
$C_{12-18}$-alkyl methacrylate residual monomer content: 1.2%
MMA residual monomer content: 0.2%

EXAMPLE 2

A 48 m³ polymerization reactor equipped with two propeller stirrers (operated at 270 revolutions per minute) and a process control system for controlling the process parameters is initially charged with 8941.0 kg of a 100N oil and 15119.7 kg of a mixture consisting of $C_{12}$-$C_{18}$-alkyl methacrylates and methyl methacrylate (MMA) in a weight ratio of 87.0:13.0 together with 25.7 kg of dodecyl mercaptan. The temperature is adjusted to 110° C. Thereafter, 39.5 kg of tert-butyl peroctoate are metered in within 3.5 hours, 6.3% of the total amount being added within the first 1.5 hours, 10.0% within the next hour and 83.7% within the hour that then follows. The total reaction time is 8 hours.

Molecular weight: 166 000 g/mol
Polydispersity: 2.41
Kinematic viscosity at 10° C.: 1238 mm²/s
Thickening action (10% of the above product in a 150N oil):
    at 100° C.: 13.90 mm²/s
    at 40° C.: 75.00 mm²/s
Viscosity index: 193
$C_{12-18}$-alkyl methacrylate residual monomer content: 1.5%
MMA residual monomer content: 0.2%

COMPARATIVE EXAMPLE 3

A 24 m³ polymerization reactor equipped with an MIG stirrer (operated at 25 revolutions per minute) and a process control system for controlling the process parameters is initially charged with 2888.1 kg of a 100N oil and 315.7 kg of a monomer mixture consisting of $C_{12}$-$C_{18}$-alkyl methacrylates and methyl methacrylate (MMA) in a weight ratio of 85.0:15.0 together with 2.9 kg of dodecyl mercaptan. The temperature is adjusted to 100° C. Thereafter, 4.1 kg of tert-butyl peroctoate are added and, at the same time, a feed consisting of 128043 kg of a mixture of $C_{12}$-$C_{18}$-alkyl methacrylates and methyl methacrylate in a weight ratio of 85.0:15.0, and also 32.0 kg of tert-butyl peroctoate and 116.9 kg of dodecyl mercaptan, is started. The feeding time is 5 hours and the feed rate is uniform. Two hours after the end of feeding, another 26.2 kg of tert-butyl peroctoate are added. The total reaction time is 12 hours.

Molecular weight: 53300 g/mol
Polydispersity: 2.00
Kinematic viscosity at 100° C.: 1397 mm²/s
Thickening action (12% of the above product in a 150N oil):
    at 100° C.: 11.0 mm²/s
    at 40° C.: 65.7 mm²/s
Viscosity index: 160
$C_{12-18}$-alkyl methacrylate residual monomer content: 0.89%
MMA residual monomer content: 0.14%

EXAMPLE 3

An 11 m³ polymerization reactor equipped with an MIG stirrer (operated at 31 revolutions per minute) and a process control system for controlling the process parameters is initially charged with 1377.9 kg of a 100N oil and 6150.3 kg of a monomer mixture consisting of $C_{12}$-$C_{18}$-alkyl methacrylates and methyl methacrylate (MMA) in a weight ratio of 85.0:15.0 together with 52.3 kg of dodecyl mercaptan. The temperature is adjusted to 110° C. Thereafter, 9.8 kg of tert-butyl peroctoate are metered in within 3.5 hours, 6.3% of the total amount being added within the first 1.5 hours, 10.0% within the next hour and 837% within the last hour. The total reaction time is 8 hours.

Molecular weight: 55 400 g/mol
Polydispersity: 2.04
Kinematic viscosity at 100° C.: 1219 mm$^2$/s
Thickening action (12% of the above product in a 150N oil):
at 100° C., 10.99 mm$^2$/s
at 40° C., 65.3 mm$^2$/s
Viscosity index: 161
$C_{12-18}$-alkyl methacrylate residual monomer content: 1.63%
MMA residual monomer content: 0.27%

COMPARATIVE EXAMPLE 4

A 24 m$^3$ polymerization reactor equipped with an MIG stirrer (operated at 25 revolutions per minute) and a process control system for controlling the process parameters is initially charged with 5593.1 kg of a 100N oil and 622.8 kg of a monomer mixture consisting of $C_{12}$-$C_{18}$-alkyl methacrylates and methyl methacrylate (MMA) in a weight ratio of 85.0:15.0 together with 2.9 kg of dodecyl mercaptan. The temperature is adjusted to 100° C. Thereafter, 3.8 kg of tert-butyl peroctoate are added and, at the same time, a feed consisting of 11796.9 kg of a mixture of $C_{12}$-$C_{18}$-alkyl methacrylates and methyl methacrylate in a weight ratio of 85.0:15.0, and also 29.5 kg of tert-butyl peroctoate and 54.2 kg of dodecyl mercaptan, is started. The feeding time is 5 hours and the feed rate is uniform. Two hours after the end of feeding, another 24.8 kg of tert-butyl peroctoate are added. The total reaction time is 12 hours.

Molecular weight: 98100 g/mol
Polydispersity: 2.12
Kinematic viscosity at 10° C.: 1251 mm$^2$/s
Thickening action (10% of the above product in a 150N oil):
at 100° C.: 11.26 mm$^2$/s
at 40° C.: 61.6 mm$^2$/s
Viscosity index: 179
$C_{12-18}$-alkyl methacrylate residual monomer content: 0.84%
MMA residual monomer content: 0.15%

EXAMPLE 4

A 48 m$^3$ polymerization reactor equipped with two propeller stirrers (operated at 270 revolutions per minute) and a process control system for controlling the process parameters is initially charged with 7480.7 kg of a 100N oil and 16559.9 kg of a monomer mixture consisting of $C_{12}$-$C_{18}$-alkyl methacrylates and methyl methacrylate (MMA) in a weight ratio of 85.0:15.0 together with 67.9 kg of dodecyl mercaptan. The temperature is adjusted to 110° C. Thereafter, 34.0 kg of tert-butyl peroctoate are metered in within 3.5 hours, 6.3% of the total amount being added within the first 1.5 hours, 10.0% within the next hour and 83.7% within the last hour. The total reaction time is 8 hours.

Molecular weight: 98 700 g/mol
Polydispersity: 2.14
Kinematic viscosity at 100° C.: 1149 mm$^2$/s
Thickening action (10% of the above product in a 150N oil):
at 100° C.: 11.20 mm$^2$/s
at 40° C.: 61.2 mm$^2$/s
Viscosity index: 178
$C_{12-18}$-alkyl methacrylate residual monomer content: 1.28%
MMA residual monomer content: 0.23%

Table 1 below compares the amounts of initiator used.

TABLE 1

Amounts of initiator used

| | Amount of initiator used [kg] | Batch size [kg] | Amount of initiator per 100 kg of finished product [kg] | Initiator saving in % |
|---|---|---|---|---|
| Comparative 1 | 0.0257 | 9.0 | 0.2854 | |
| Example 1 | 0.0144 | 7.5 | 0.1920 | −32.7% |
| Comparative 2 | 41.9 | 18013.1 | 0.2326 | |
| Example 2 | 39.5 | 24060.7 | 0.1642 | −29.4% |
| Comparative 3 | 36.1 | 18008.1 | 0.2255 | |
| Example 3 | 9.8 | 7528.2 | 0.1302 | −42.3% |
| Comparative 4 | 33.3 | 18012.8 | 0.1849 | |
| Example 4 | 34 | 24040.6 | 0.1414 | −23.5% |

The invention claimed is:

1. A process for free-radically polymerizing one or more ethylenically unsaturated compounds, comprising:
   initially charging, at least 80.0% by weight of the one or more ethylenically unsaturated compounds, based on the total weight of the ethylenically unsaturated compounds, to a reactor; and
   adding at least one polymerization initiator for the free-radical polymerization to the reactor in at least two continuous metered steps;
   wherein
   the second continuous metered step is begun at a time at which from 0.01 to 50.0% of a total amount of the polymerization initiator added during the first continuous metered step is not consumed,
   more polymerization initiator is added in the second step than in the first step, and
   a ratio of a mean metering rate of the second step to a mean metering rate of the first step is greater than 1.2:1.

2. The process as claimed in claim 1, wherein the polymerization initiator is added in at least three steps, more initiator being added in the third step than in the first and in the second step.

3. The process as claimed in claim 2, wherein the polymerization initiator is added all at once in the third step.

4. The process as claimed in claim 2, wherein the polymerization initiator is metered in the third step.

5. The process as claimed in claim 4, wherein the mean metering rate of the third step is greater than the mean metering rate of the second step.

6. The process as claimed in claim 4, wherein the ratio of the mean metering rate of the third step to the mean metering rate of the second step is greater than 1.2:1.

7. The process as claimed in claim 2, wherein the third step is begun at a time at which from 0.01 to 50.0% of the total amount of the polymerization initiator added during the second step is not consumed.

8. The process as claimed in claim 1, wherein the metering rate for the addition of the polymerization initiator continuously increases.

9. The process as claimed in claim 1, wherein the one or more ethylenically unsaturated compounds comprises at least one selected from the group consisting of a (meth)acrylate, a maleate and a fumarate.

10. The process as claimed in claim 9, wherein the one or more ethylenically unsaturated compounds consists of:

a) from 0 to 40% by weight of one or more ethylenically unsaturated ester compounds of the formula (I)

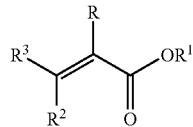

(I)

where R is hydrogen or methyl, $R^1$ is a linear or branched alkyl radical having 1 to 5 carbon atoms, $R^2$ and $R^3$ are each independently hydrogen or a group of the formula —COOR' where R' is hydrogen or an alkyl group having from 1 to 5 carbon atoms, b) from 60.0 to 100% by weight of one or more ethylenically unsaturated ester compounds of the formula (II)

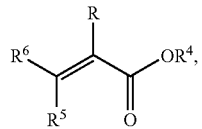

(II)

where R is hydrogen or methyl, $R^4$ is a linear or branched alkyl radical having from 6 to 40 carbon atoms, $R^5$ and $R^6$ are independently hydrogen or a group of the formula —COOR" where R" is hydrogen or an alkyl group having from 6 to 40 carbon atoms, and c) from 0 to 50% by weight of one or more comonomers, based in each case on the total weight of the monomer composition.

11. The process as claimed in claim 1, wherein the at least one polymerization initiator comprises a peroxide.

12. The process as claimed in claim 1, wherein the at least one polymerization initiator is added as a solution.

13. The process as claimed in claim 1, wherein a temperature in the reactor during the at least one polymerization initiator addition is in the range from 50 to 180° C. and the temperature is maintained in this range until the free radical polymerization is complete.

14. The process as claimed in claim 1, wherein the polymerization is performed in at least one organic solvent.

15. The process as claimed in claim 14, wherein the solvent is a mineral oil of API group I, II or III or a synthetic oil.

16. The process as claimed in claim 1, wherein a polymeric product having a weight-average molecular weight in the range from 2000 to 5 000 000 g/mol is obtained by selection of the amount of one or more ethylenically unsaturated compounds, polymerization initiator and, if appropriate, chain transferer.

* * * * *